(12) United States Patent
Tanino et al.

(10) Patent No.: US 6,804,728 B2
(45) Date of Patent: Oct. 12, 2004

(54) I/O CONTROL DEVICE AND I/O CONTROL METHOD

(75) Inventors: Shingo Tanino, Kawasaki (JP); Kunihiko Kassai, Kawasaki (JP); Hideyuki Tanaka, Kawasaki (JP); Takaaki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 43 days.

(21) Appl. No.: 10/236,915

(22) Filed: Sep. 9, 2002

(65) Prior Publication Data

US 2003/0014571 A1 Jan. 16, 2003

Related U.S. Application Data

(63) Continuation of application No. PCT/JP00/01434, filed on Mar. 9, 2000.

(51) Int. Cl.[7] .............................................. G06F 13/00
(52) U.S. Cl. ............................ 710/18; 710/36; 710/58; 710/59; 710/60; 710/241
(58) Field of Search ............................. 710/18, 15, 33, 710/36, 58, 59, 60, 240, 241

(56) References Cited

U.S. PATENT DOCUMENTS 5,925,112 A * 7/1999 Haneda et al. ................ 710/33
6,006,286 A * 12/1999 Baker et al. .................. 710/22
6,493,774 B2 * 12/2002 Suzuki et al. ................ 710/100

FOREIGN PATENT DOCUMENTS

| JP | 54033687 A | 3/1979 | |
|----|------------|--------|--|
| JP | 57043222 A | 3/1982 | |
| JP | 59033687 A | 2/1984 | |
| JP | 61149753 A | 7/1986 | |
| JP | 362105253 A | * 5/1987 | ........... G06F/13/00 |
| JP | 63149753 A | 6/1988 | |
| JP | 07200453 A | 8/1995 | |

* cited by examiner

Primary Examiner—Rehana Perveen
(74) Attorney, Agent, or Firm—Staas & Halsey LLP

(57) ABSTRACT

An I/O control device that transfers data according to transfer control information, comprising a transfer control information memory means that stores transfer control information, a state detecting means that detects the processed state of the transfer control information stored in the transfer control information memory means, and a transfer control information memory control means by which new transfer control information is stored in the transfer control information memory means in place of the transfer control information upon completion of transfer control information-dependent transfer processing as a result of the detection by the state detecting means.

6 Claims, 20 Drawing Sheets

FIG.4

|   | B1  | B2  | ... | Bn-1 | Bn  |
|---|-----|-----|-----|------|-----|
| a | 0/1 | 0/1 |     | 0/1  | 0/1 |
| b | 0/1 | 0/1 |     | 0/1  | 0/1 |
| c | 0/1 | 0/1 |     | 0/1  | 0/1 |
| d | 0/1 | 0/1 |     | 0/1  | 0/1 |
| e | 0/1 | 0/1 |     | 0/1  | 0/1 |

| | a | b | c |
|---|---|---|---|
| A1 | A2 | * | * |
| A2 | A3 | * | * |
| ⋮ | ⋮ | ⋮ | ⋮ |
| An-1 | An | * | * |
| An | End | * | * |

* : don't care.

START
| a | b | c |
|---|---|---|
| A1 | End | End |

44   45   46

I/O CONTROL DEVICE AND I/O CONTROL METHOD

This is a continuation of application. No. PCT/JP00/01434, filed Mar. 9, 2000.

TECHNICAL FIELD OF THE INVENTION

The present invention generally relates to an I/O control device and an I/O control method, and particularly to an I/O control device and an I/O control method for transferring data.

A system exists for transferring data residing in one place to another remote domain. In such a system, the I/O instruction is managed upon the transferring of data.

Here, the manageable I/O instruction is determined and controlled according to the storage capacity of the memory.

BACKGROUND OF THE INVENTION

FIG. 1 is a block diagram showing an example of a conventional remote copy system. The remote copy system 1 is composed of a host computer 2, an I/O control device 3, a storage device 4, and a circuit control mechanism 5.

The host computer 2 issues I/O commands, transfers data, and the like. The I/O control device 3 is connected between the host computer, the device 4, and the circuit control mechanism 5, and controls the input/output of data according to the I/O instruction.

The device 4 is a storage device such as a hard disk and the like. The circuit control mechanism 5 is connected to circuit 6.

The I/O control device 3 is mainly composed of a channel adapter 11, a device adapter 12, a remote adapter 13, a control unit 14, and a transfer control information table 15.

The channel adapter 11 is a device for establishing communication with the host computer 2. The device adapter 12 is a device for establishing communication with the device 4. The remote adapter 13 is a device for establishing communication with the circuit control mechanism 5.

The control unit 14 controls the transfer of data based on the I/O instruction from the host computer 2. The transfer control information table 15 is a table that contains the transfer control information.

Now, the operation of the conventional remote copy system shall be explained.

The I/O instruction for executing a remote copying operation is supplied from the host computer 2 to the I/O control device 3. The I/O instruction is first supplied to the channel adapter 11. Upon receiving the I/O instruction from the host computer 2, the channel adapter 11 communicates the received I/O instruction to the control unit 14.

Upon receiving the I/O instruction, the control unit 14 establishes a transfer control information table 15 for storing transfer control information into the memory of the I/O control device. The transfer control information table 15 establishes a pre-set and predetermined storage domain. The transfer control information is stored in the transfer control information table 15.

FIG. 2 illustrates an exemplary data composition diagram of the conventional transfer control information.

Transfer control information 20 comprises control classification information 21, update range information 22, transfer track information 23, write classification information 24, update range information 25, and error information 26.

The control classification information 21 indicates the type of I/O instruction. Such information is used, for example, to identify whether the instruction is for a simple update or a remote transfer. The update range information 22 indicates the update range.

The transfer track information 23 designates the transfer track. The write classification information 24 identifies the write type. For example, it is used in order to identify whether the write type is a format write or an update write.

The update range information 25 designates the update range. For instance, it designates the start and end of the information. The error information 26 indicates whether or not an error has occurred.

The control unit 14 reads the data on the track which is to be transferred from device 4 based on the transfer control information stored in transfer control information table 15, and supplies this to the remote adapter 13. The remote adapter 13 supplies the data from the control unit 14 to the circuit control mechanism 5. The circuit control mechanism 5 supplies this to other devices via circuit 6.

The above is a description of a remote copying operation.

However, in the above remote copying operation, the amount of data for which the remote copying operation can be performed at one time with the I/O instruction is limited according to the storage capacity of the transfer control information table 15. Therefore, for transferring a large volume of transfer data, it is necessary to perform the transfer by segmenting the I/O instruction.

The object of the present invention is to enable the transfer of data, which does not impose a limitation to the amount of data to be transferred.

DISCLOSURE OF THE INVENTION

The present invention detects the processed state of the transfer control information stored in the transfer control information memory means, and upon completion of transfer control information-dependent transfer processing as a result of the state detection, stores new transfer control information in the transfer control information memory means in place of the above transfer control information.

According to the present invention, the transfer control information can be established without taking into account the limitation of the capacity of the transfer control information memory means though it may have a fixed capacity. Thus, even small devices with a relatively small memory capacity will be able to provide functions similar to that of bigger devices without any demerits whatsoever.

Also, upon detecting an error state in the processing corresponding to the transfer control information, the present invention leaves that transfer control information stored in the transfer control information memory means.

According to the present invention, the transfer control information having an error detected therein will be stored as it is so that the cause of the error may be investigated by examining the stored transfer control information.

BRIEF DESCRIPTION OF THE DRAWINGS

FIG. 4 is a data composition diagram of the transfer control information table bit map according to the first embodiment of the present invention.

FIG. 15 is a data composition diagram of the transfer control information table according to the second embodiment of the present invention.

PREFERRED EMBODIMENTS OF THE INVENTION

Figure 3:
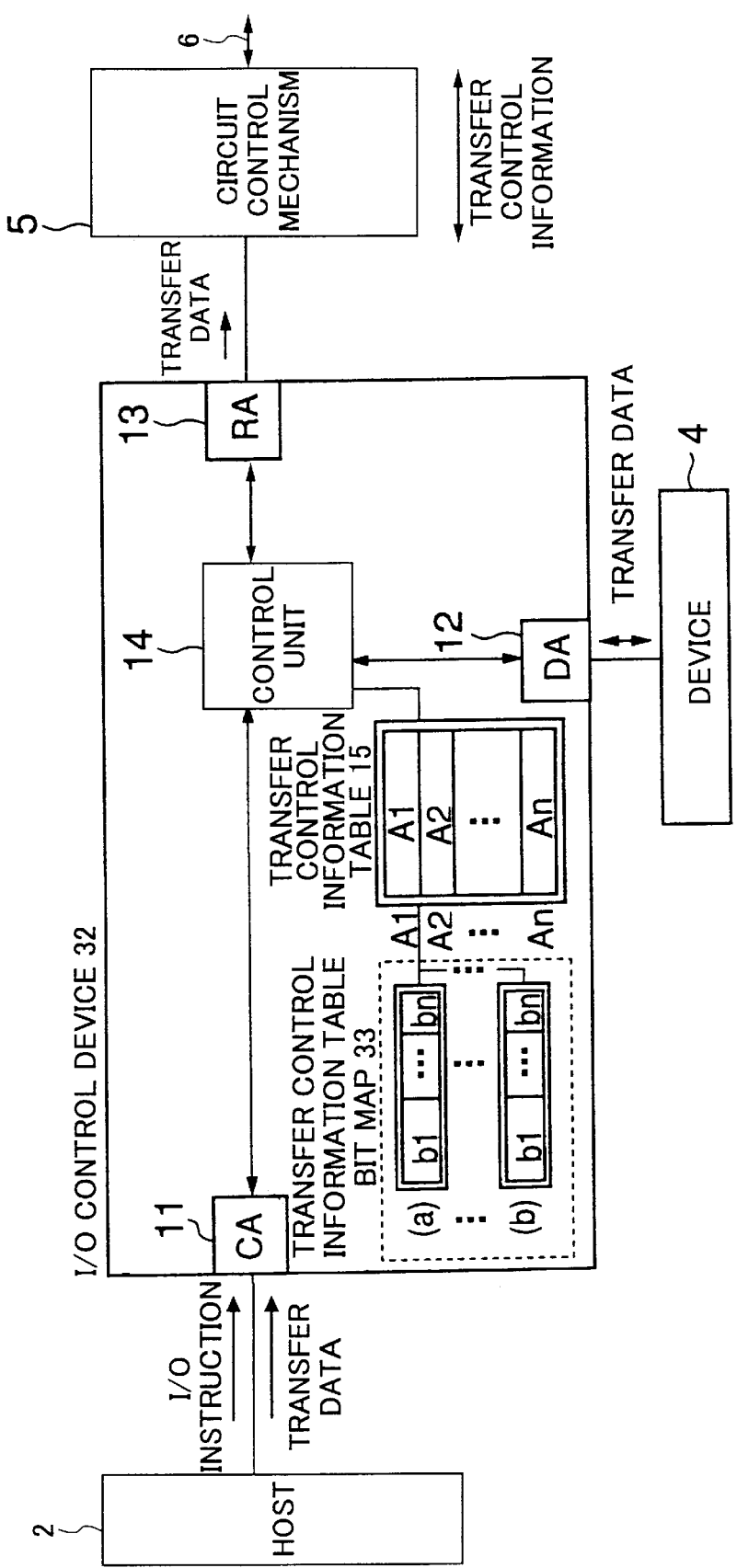
FIG. 3 is a block diagram illustrating a first embodiment of the present invention.

FIG. 3 is a block diagram illustrating the first embodiment of the present invention. The components in the above drawing which correspond to the components in FIG. 1 are given the same numerical notations and their description shall be omitted.

Figure 1:
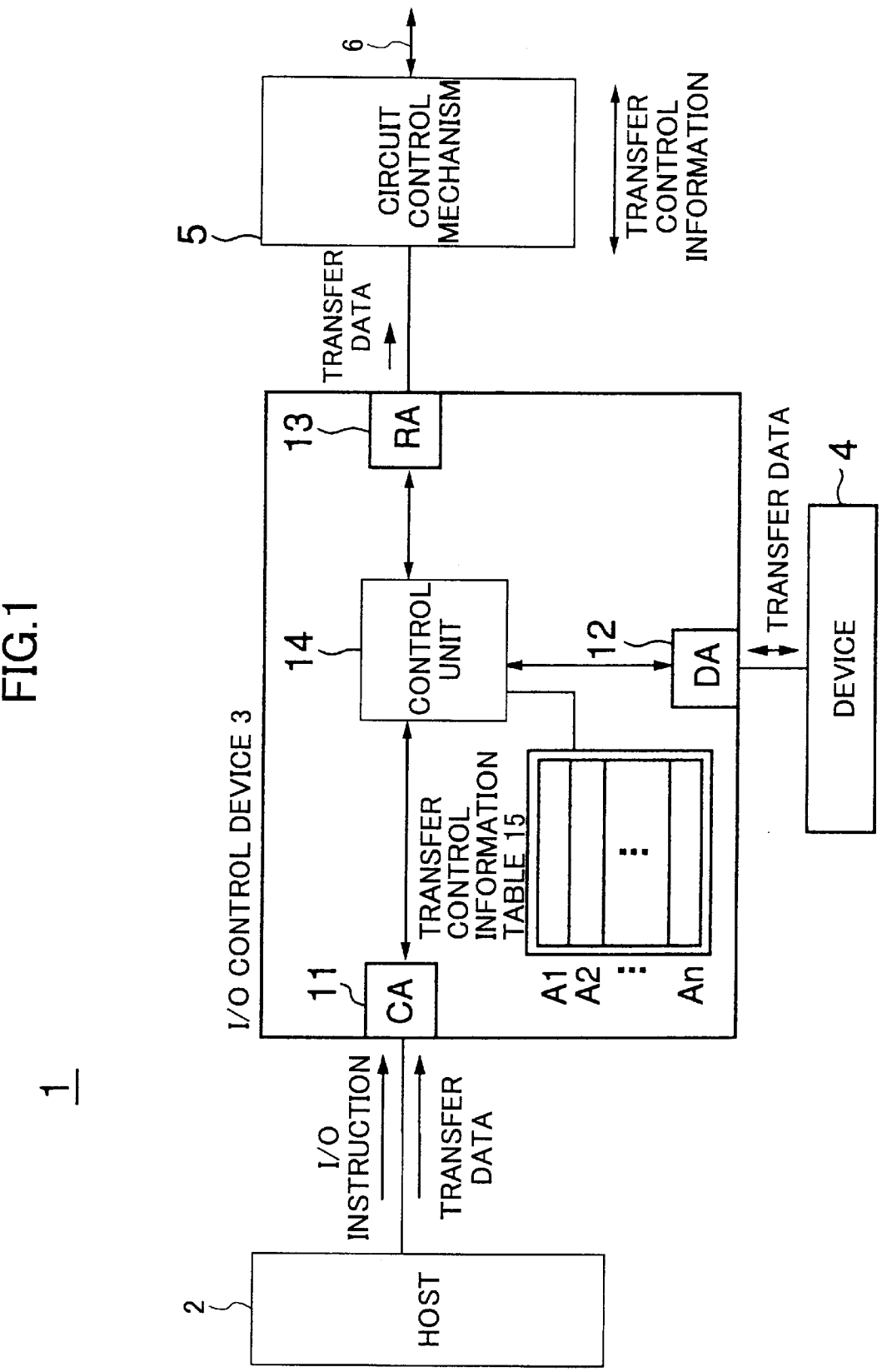
FIG. 1 is a block diagram illustrating an example of a conventional remote copy system.

The remote copy system 31 according to this embodiment comprises an I/O control device 32 which differs in structure from that of FIG. 1. The I/O control device 32 according to this embodiment implements a transfer control information table bit map 33 in addition to the other components. Further, the process in control unit 14 is different from that of the control unit 14 shown in FIG. 1.

The transfer control information table bit map 33 is provided with bits for identifying the processed state of the transfer control information of the transfer control information table 15.

FIG. 4 is a data composition diagram of a transfer control information table bit map according to the first embodiment of the present invention.

Figure 2:
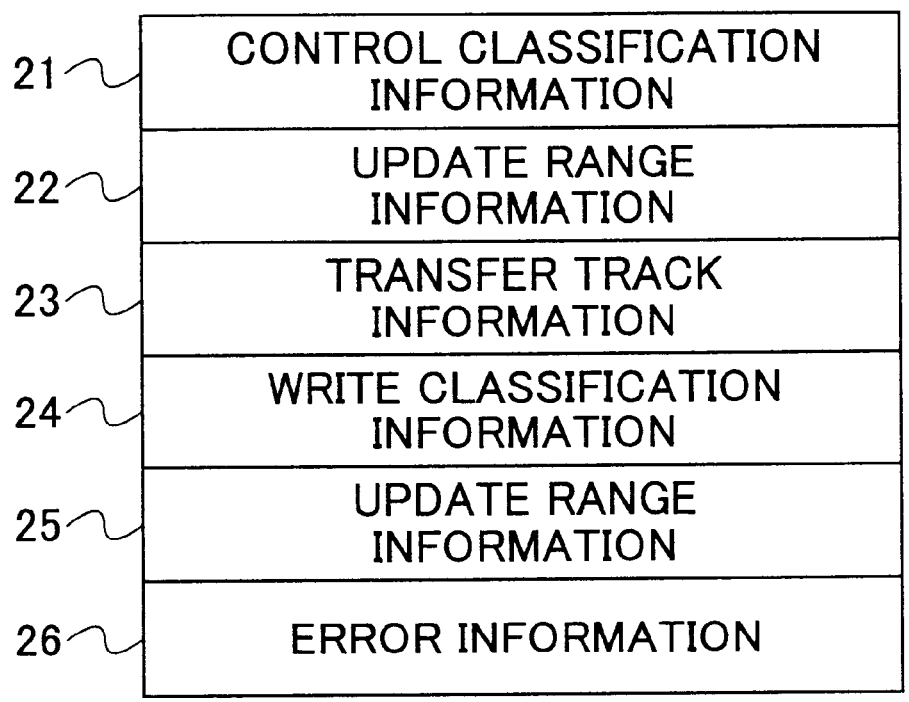
FIG. 2 is a data composition diagram illustrating an example of the conventional transfer control information.

The transfer control information table bit map 33 comprises bit information elements (a) through (e). The domains established in the transfer control information table 15 are denoted as A1 through An. Transfer control information 20, shown in FIG. 2, is stored in each of the domains A1 through An.

Bit information elements (a) through (e) each have bits B1 through Bn. B1 indicates the state of domain A1, and B2 indicates the state of domain A2. Bn indicates the state of domain An.

Bit information (a) indicates whether the domain A1 through An are spare or in use. The bits B1 through Bn of bit information (a) are assigned either a "0" or a "1". "0" represents a spare state, "1", an in-use state.

Bit information (b) indicates the operation state of the copying. The bits B1 through Bn of bit information (b) are assigned either a "0" or a "1". "0" represents a non-operating copy state, "1", an operating copy state.

Bit information (c) indicates whether or not there is an abort. The bits B1 through Bn of bit information (c) are assigned either a "0" or a "1". "0" represents a state without an abort, "1", a state with an abort.

Bit information (d) indicates the completion state of the copying. The bits B1 through Bn of bit information (d) are assigned either a "0" or a "1". "0" represents an incompletely copied state, "1", a completely copied state.

Bit information (e) indicates the state of usage of the device adapter 12. The bits B1 through Bn of bit information (e) are assigned either a "0" or a "1". "0" represents a state of not-in-use of the device adapter 12, "1", a state of in-use of the device adapter 12.

The control unit 14 provides the bits to the above transfer control information table bit map 33, and also controls the transfer control information table 15 according to the assigned bits.

Now, the operation of the I/O control device 32 shall be described.

First, the operation of the channel adapter 11 shall be described.

Figure 5:
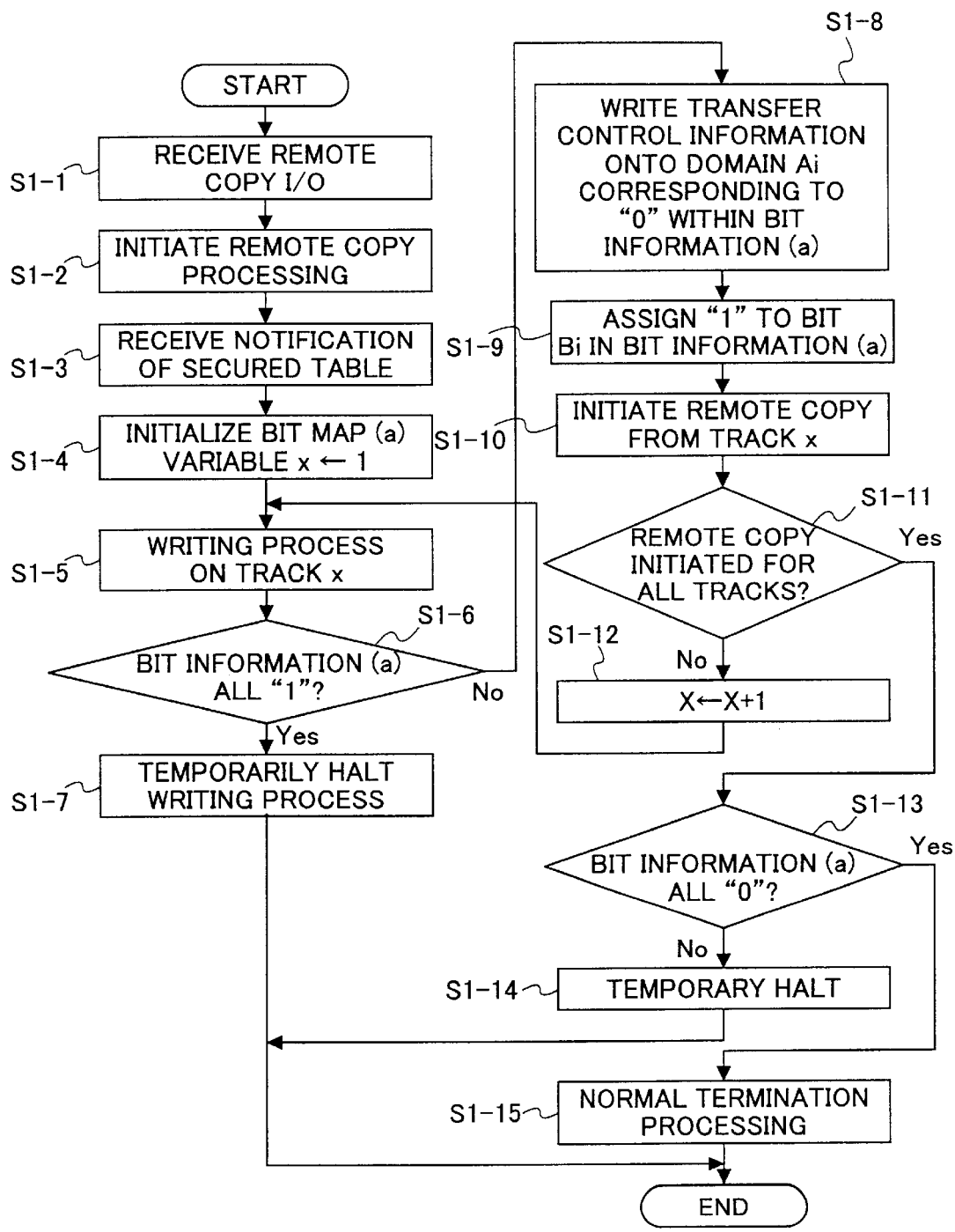
FIG. 5 is a processing flow chart of a channel adapter according to the first embodiment of the present invention.

FIG. 5 is a processing flow chart of the channel adapter according to the first embodiment of the present invention.

The channel adapter 11 process comprises the steps S1-1 through S1-14.

S1-1 is a step of receiving the I/O instruction for remote copy from the host computer 2. Here, it is assumed that the I/O instruction may be arranged to perform an update for M (M: any number) tracks.

S1-2 is a step of initiating the remote copying process of the control unit 14.

S1-3 is a step of receiving a notification, from the control unit 14, that the transfer control information table 15 has been established.

Step S1-4 is a processing step of initializing all of the bits B1 through Bn of bit information (a) within the transfer control information table bit map 33, by setting them to "0", and replacing variable x ($1 \leq x \leq M$) with "1".

S1-5 is a step for performing the process of writing the data onto track x which is the $x^{th}$ track, within the I/O instructions.

S1-6 is a step of determining whether or not all the bits B1 through Bn of bit information (a) within the transfer control information table bit map 33, are set to "1". It is possible to determine whether or not there are any spare domains among the domains A1 through An, by looking at the bit information (a). If it is determined that all the bits B1 through Bn of bit information are set to "1" in step S1-6, then step S1-7 will be performed.

S1-7 is a step of temporarily halting the writing of transfer control information 20 to transfer control information table 15.

If it is determined in step S1-6 that at least one bit from the bits B1 through Bn of bit information (a) is set to "0", then step S1-8 will be performed.

S1-8 is a step of writing the transfer control information to domain Ai that corresponds to bit Bi. The bit Bi represents the bit among bits B1 through Bn which is a "0" and which corresponds to track x.

S1-9 is a step of setting the bit Bi to "1".

S1-10 is a step of causing the control unit 14 to initiate the remote copy indicated by the transfer control information of the domain Ai.

S1-11 is a step for determining whether or not all the remote copying for the M number of tracks has been initiated. If not all the remote copying for the M number of tracks has been initiated in step S1-11, then step S1-12 will be performed. Step S1-12 is a step of replacing variable x with (x+1).

If it is determined in step S1-11, that all the remote copying for the M number of tracks has been initiated, then step S1-13 will be performed. Step S1-13 is a step of determining whether or not all the bits B1 through Bn of the bit information (a) are a "0".

If at least one bit among the bits B1 through Bn of bit information (a) is a "1", then step S1-14 will be performed. Step S1-14 is a step of a temporary halt.

If all the bits B1 through Bn of the bit information (a) are a "0", then step S1-15 will be performed. Step S1-15 is a normal termination process. In a normal termination process, a notification of the normal termination of the remote copy is made to the host computer 2.

Now, the processing of the channel adapter 11 dependent on the transfer control information table bit map 33 will be described.

Figure 6:
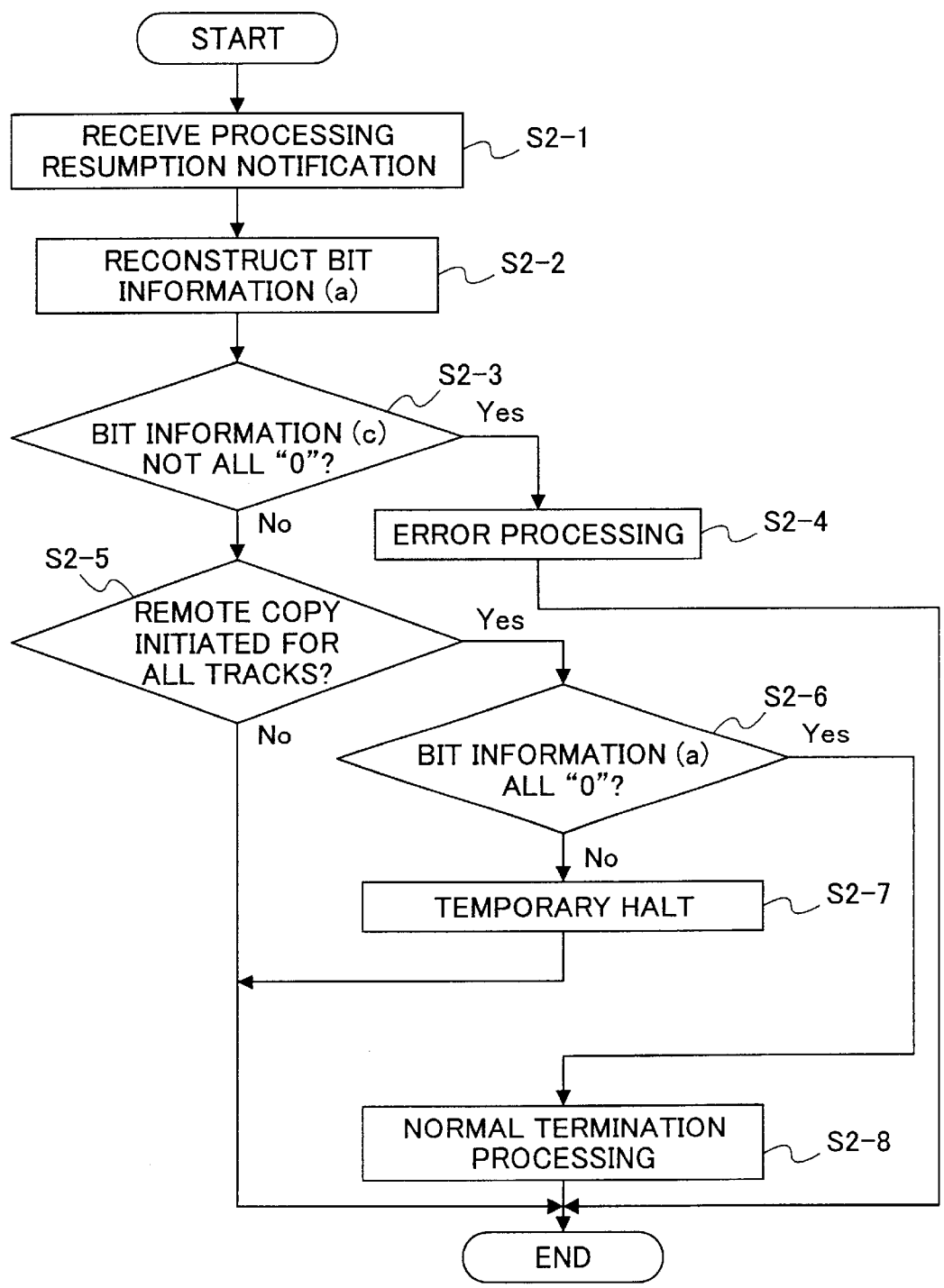
FIG. 6 is a processing flow chart of the channel adapter dependent on the transfer control information table bit map, according to an embodiment of the present invention.

FIG. 6 is a flow chart of the processing of a channel adapter dependent on a transfer control information table bit map, according to an embodiment of the present invention.

The processing of the channel adapter 11 dependent on the transfer control information table bit map 33 comprises steps S2-1 through S2-8.

S2-1 is a step of receiving a processing resumption notification from the control unit 14.

S2-2 is a step of reconstructing bit information (a). The process of step S2-2 will be described in further detail later on.

S2-3 is a step of determining whether or not at least one bit among the bits B1 through Bn of the bit information (a) is a "1". If at least one bit is a "1" in step S2-3, then step S2-4 will be performed. Step S2-4 is a step of performing error processing. Error processing is a process of notifying the host computer 2 of an error.

If all the bits B1 through Bn of the bit information (a) are a "0" in step S2-3, then step S2-5 will be performed. Step S2-5 is a step of determining whether or not the remote copying for all the M number of tracks has been initiated.

If it is determined, in step S2-5, that the remote copying for all the M number of tracks has been initiated, step S2-6 will be performed.

If there is at least one bit among bits B1 through Bn of bit information (a) that is a "1", then step S2-7 will be performed. Step S2-7 is a step of temporarily halting the process until the remote copying has been completed for all of the M number of tracks.

Further, if it is determined, in step S2-6, that all the bits B1 through Bn of the bit information (a) are a "0", step S2-8 will then be performed. Step S2-8 is a normal termination process. In the normal termination process, a process of notifying the host computer 2 of the normal completion of the remote copying is performed.

Now, the reconstruction process of bit information (a) in step S2-2 shall be described in further detail.

Figure 7:
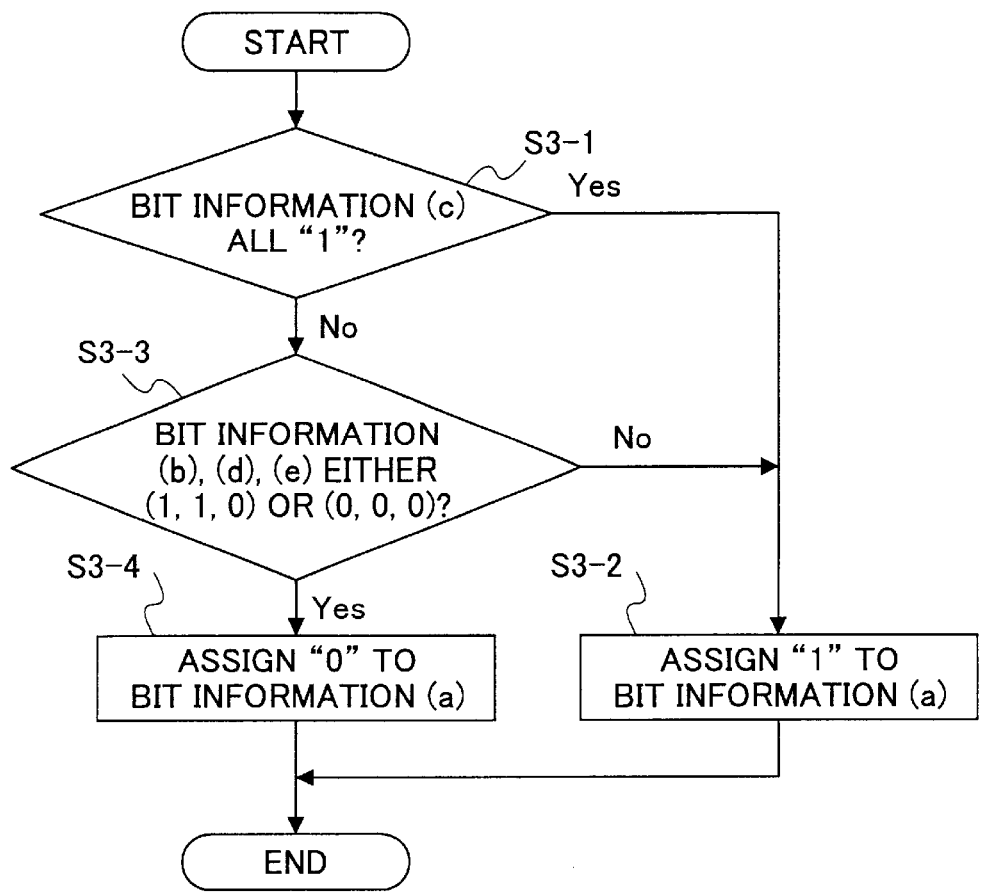
FIG. 7 is a processing flow chart of a bit information reconstruction process of the channel adapter, according to the first embodiment of the present invention.

FIG. 7 is a processing flow chart of a bit information reconstruction process of the channel adapter according to the first embodiment of the present invention.

The bit information reconstruction process of step S2-2 comprises steps S3-1 through S3-4.

S3-1 is a step of determining whether or not bit information (c) of each of the corresponding domains is a "1". In step S3-1, it is determined whether or not the transfer control information is used by referring to its corresponding bit information (c). If the bit information (c) is a "1" in step S3-1, this means that the corresponding transfer control information is in a state of an abort and thus, is determined that it is in use.

When the bit information (c) is a "1" in step S3-1, step S3-2 will be performed. Step S3-2 sets bit information (a) to a "1". When the bit information (c) is a "0" in step S3-1, step S3-3 will be performed.

S3-3 is a step of determining whether or not the bit information (b), (d), (e) of the corresponding domain are either "1", "1", "0" or "0", "0", "0" respectively.

In step S3-3, the set of bit information (b), (d), (e) is determined in order to determine whether or not its transfer control information is in use. When the set of bit information (b), (d), (e) is (1, 1, 0) or (0, 0, 0), it can be determined that the remote copying by the transfer control information has been completed. When the set of bit information (b), (d), (e) is a set other than (1, 1, 0) or (0, 0, 0), it can be determined that the transfer control information is still in use.

When the set of bit information (b), (d), (e) is (1, 1, 0) or (0, 0, 0) in step S3-3, step S3-4 will be performed.

S3-4 is a step of setting bit information (a) to a "0". Since it has been determined in step S3-3 that the remote copying by the transfer control information has been completed, the bit information (a) is set to "0" in step S3-4, indicating that the transfer control information is no longer in use.

When the set of bit information (b), (d), (e) is a set other than (1, 1, 0) or (0, 0, 0), it can be determined that the transfer control information is still in use and thus step S3-2 will be performed.

Thus, the bit information (a) is reconstructed by the above-mentioned steps S3-1 through S3-4.

Now, the operation of the control unit 14 will be described in further detail.

Figure 8:
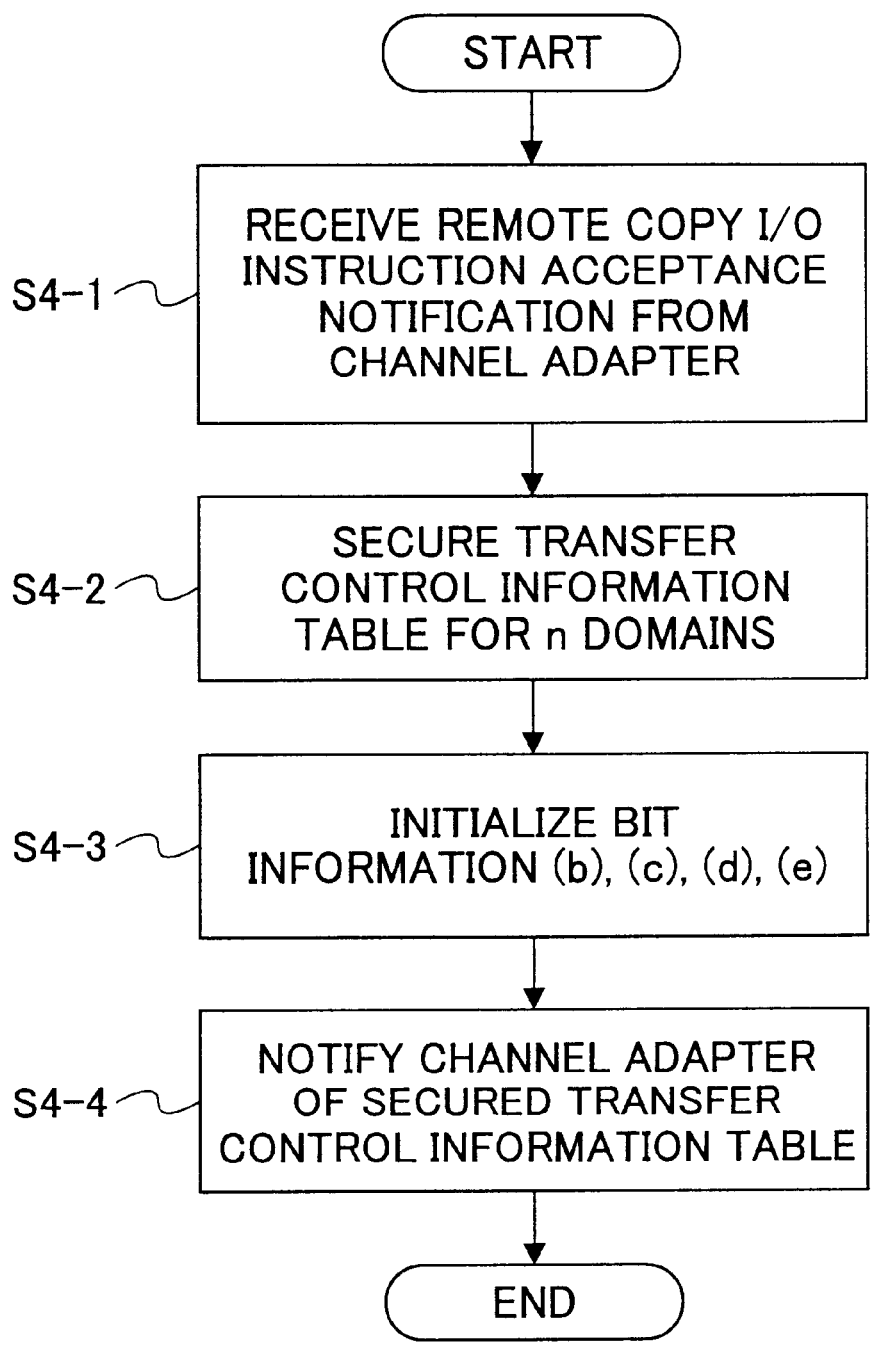
FIG. 8 is a processing flow chart of a control unit according to the first embodiment of the present invention.

FIG. 8 is a processing flow chart of a control unit according to the first embodiment of the present invention.

The control unit 14 performs the process of the following steps S4-1 through S4-4.

S4-1 is a step of receiving a remote copy I/O instruction acceptance notification from the channel adapter 11.

S4-2 is a step of securing transfer control information table 15 for n domains.

S4-3 is a step of initializing the bit information (b), (c) (d), and (e) at a "0".

S4-4 is a step of notifying the channel adapter 11 that the transfer control information table has been established.

Now, the remote copying process by the transfer control information table bit map 33 of the control unit 14 shall be described in further detail.

Figure 9:
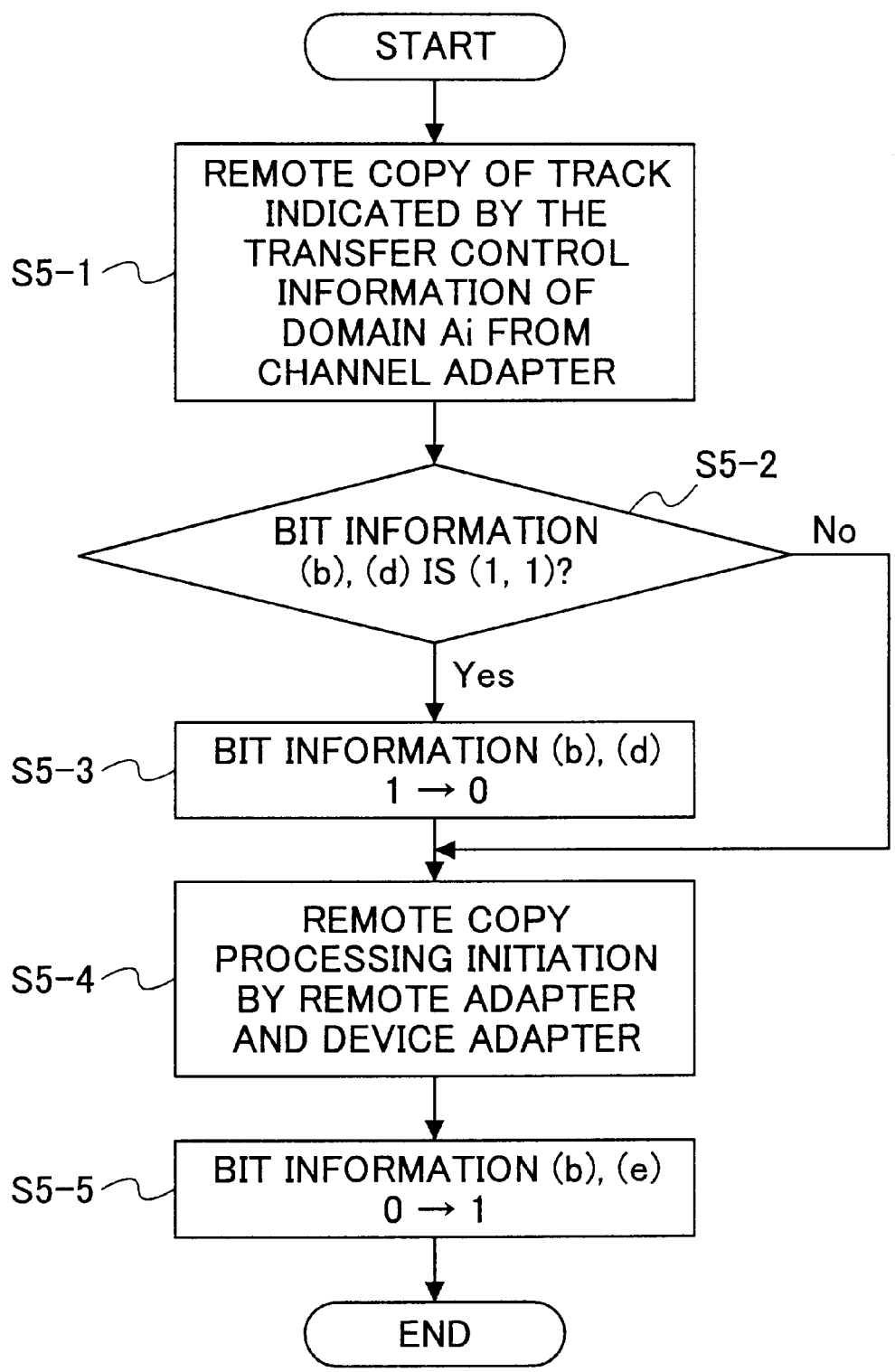
FIG. 9 is a processing flow chart of the control unit upon the initiation of the remote copying from the channel adapter, according to the first embodiment of the present invention.

FIG. 9 is a processing flow chart of the control unit when the remote copy initiation from the channel adapter takes place, according to the first embodiment of the present invention.

The remote copying process comprises steps S5-1 through S5-5. S5-1 is a step of receiving a remote copying notification of track x indicated by the transfer control information of domain Ai from the channel adapter 11.

S5-2 is a step of determining whether or not the set of bit information (b) and (d) is (1, 1). If the set of the bit information (b) and (d), corresponding to bit bx, is (1, 1), then step S5-3 will be performed.

S5-3 is a step of changing both the bits Bi of bit information (b) and (d) from "1" to "0".

Now, the operation of the control unit 14 upon accepting a notification of the completion of the process from the remote adapter 13 shall be described in further detail.

Figure 10:
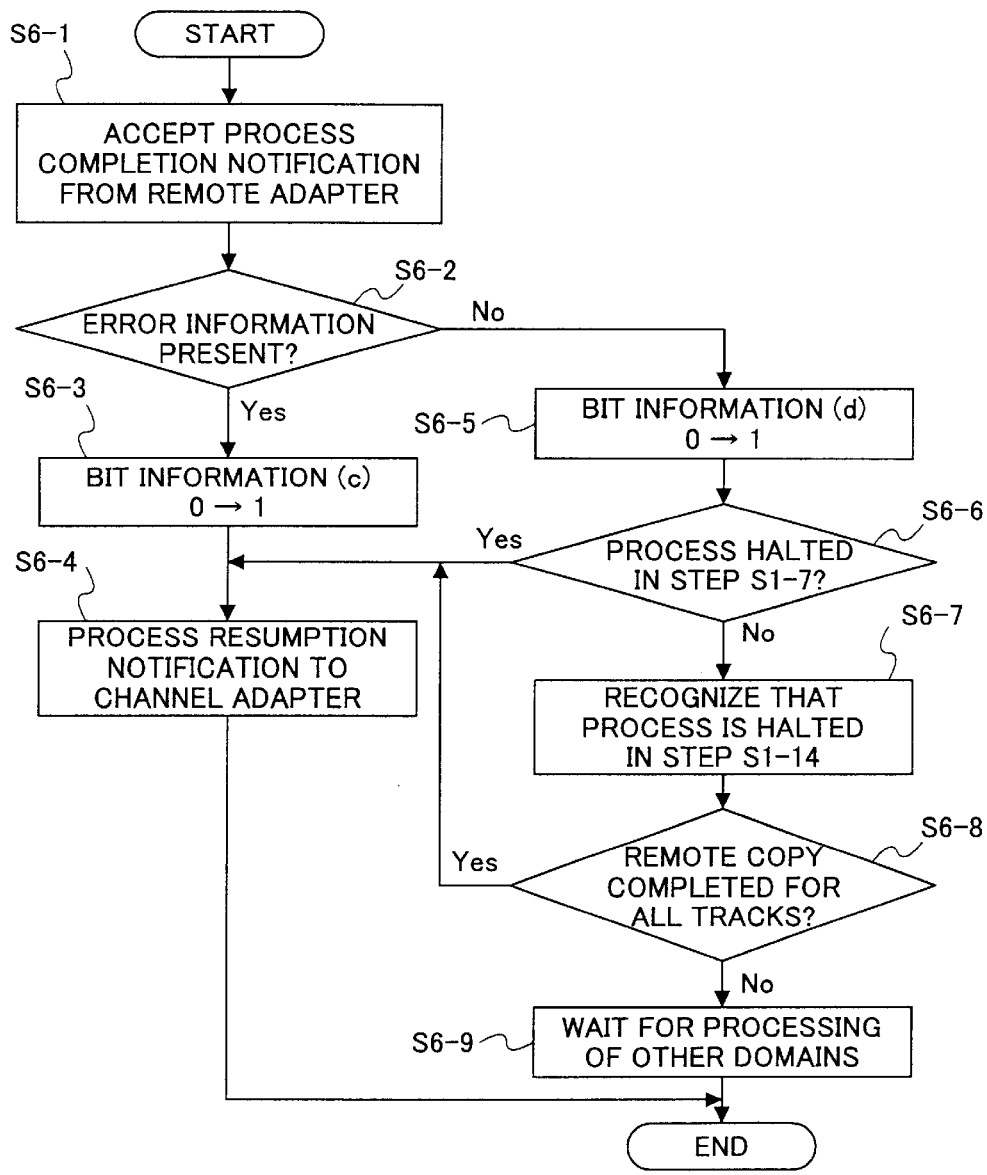
FIG. 10 is a processing flow chart of the control unit upon receiving the process completion notification from the remote adapter, according to the first embodiment of the present invention.

FIG. 10 is a processing flow chart of the control unit 14 upon accepting a notification of the completion of the process from a remote adapter, according to the first embodiment of the present invention.

The control unit 14, upon accepting the process completion notification from the remote adapter 13, performs the following steps S6-1 through S6-9.

S6-1 is a step of accepting the process completion notification from remote adapter 13.

Step S6-2 is a process of determining whether or not there is any error information in the accepted process completion notification. If error information is found in step S6-2, then step S6-3 will be performed.

Step S6-3 changes the bit Bi corresponding to bit information (c), from "0" to "1".

S6-4 is a step of notifying the channel adapter 11 of the resumption of the processing.

If it is determined, in step S6-2, that there is no error information, steps S6-5 through S6-9 will be performed. S6-5 is a step of changing the bit Bx, corresponding to bit information (d), from "0" to "1".

S6-6 is a step of determining whether or not the process is in a halt at step S1-7. If it has been determined in step S6-6 that the process is in a halt at step S1-7, a notification of the resumption of the process is made in step S6-4.

If it has been determined in step S6-6 that the process is in a halting state from causes other than step S1-7, then step S6-7 will be performed. S6-7 is a step of recognizing that the process is in a halt at step S1-14.

S6-8 is a step of determining whether or not the remote copying for all the M number of tracks has been completed. If it has been determined, in step S6-8, that the remote copying for all the M number of tracks has been completed, the resumption of the process is signaled in step S6-4.

If it has been determined in step S6-8 that not all the remote copying for the M number of tracks has been completed, step S6-9 will be performed. S6-9 is a step of waiting for the remote copying for the other domains where the remote copying has not yet been completed.

Now, the operation of the control unit 14 in response to the processing notification from the device adapter 12 shall be described in further detail.

Figure 11:
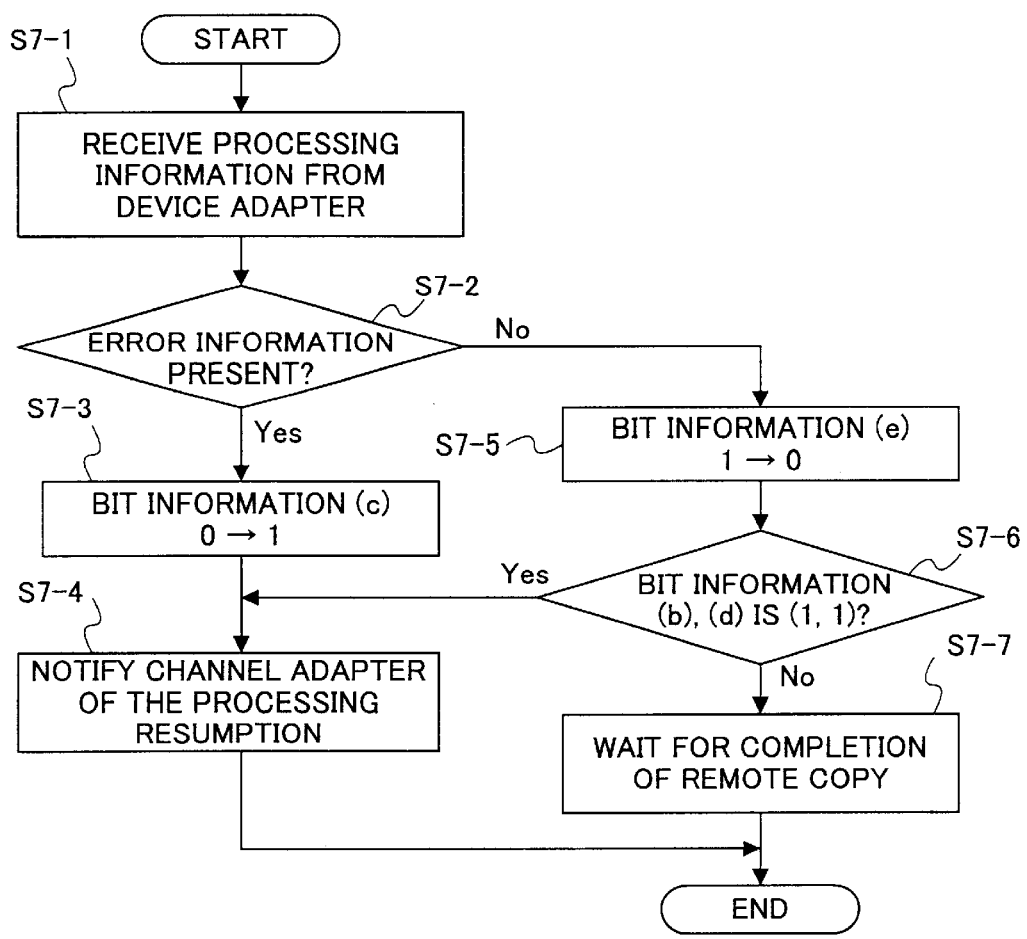
FIG. 11 is a processing flow chart of the control unit dependent on the processing notification from the device adapter, according to the first embodiment of the present invention.

FIG. 11 is a processing flow chart of the control unit 14 operating in response to processing information from the device adapter 12.

The control unit 14 performs the following steps S7-1 through S7-7 in response to the processing information from the device adapter 12.

S7-1 is a step of receiving the processing information notification from the device adapter 12.

S7-2 is a step of determining whether or not there is any error information. If, in step S7-2, an error is found in the processing information from the device adapter 12, then step S7-3 will be performed. Step S7-3 changes the bit Bi of domain Ai, corresponding to bit information (c), from "0" to "1".

S7-4 is a step of signaling the process resumption to channel adapter 11.

If there is no error found in the processing information from device adapter 12 in step S7-2, step S7-5 will be performed. Step S7-5 is a step of changing the bit Bi of bit information (e) from "1" to "0".

S7-6 is a step of determining whether or not the set of the bits Bi of bit information (b) and (d) is (1, 1).

If, in step S7-6, the set of the bits Bi of bit information (b) and (d) is (1, 1), the channel adapter 11 is notified of the resumption of the process in step S7-4.

If, in step S7-6, the set of the bits Bi of bit information (b) and (d) is not (1, 1), step S7-7 will be performed. S7-7 is a step of waiting for the completion of the remote copying.

Now, the operation of the remote adapter 13 shall be described.

Figure 12:
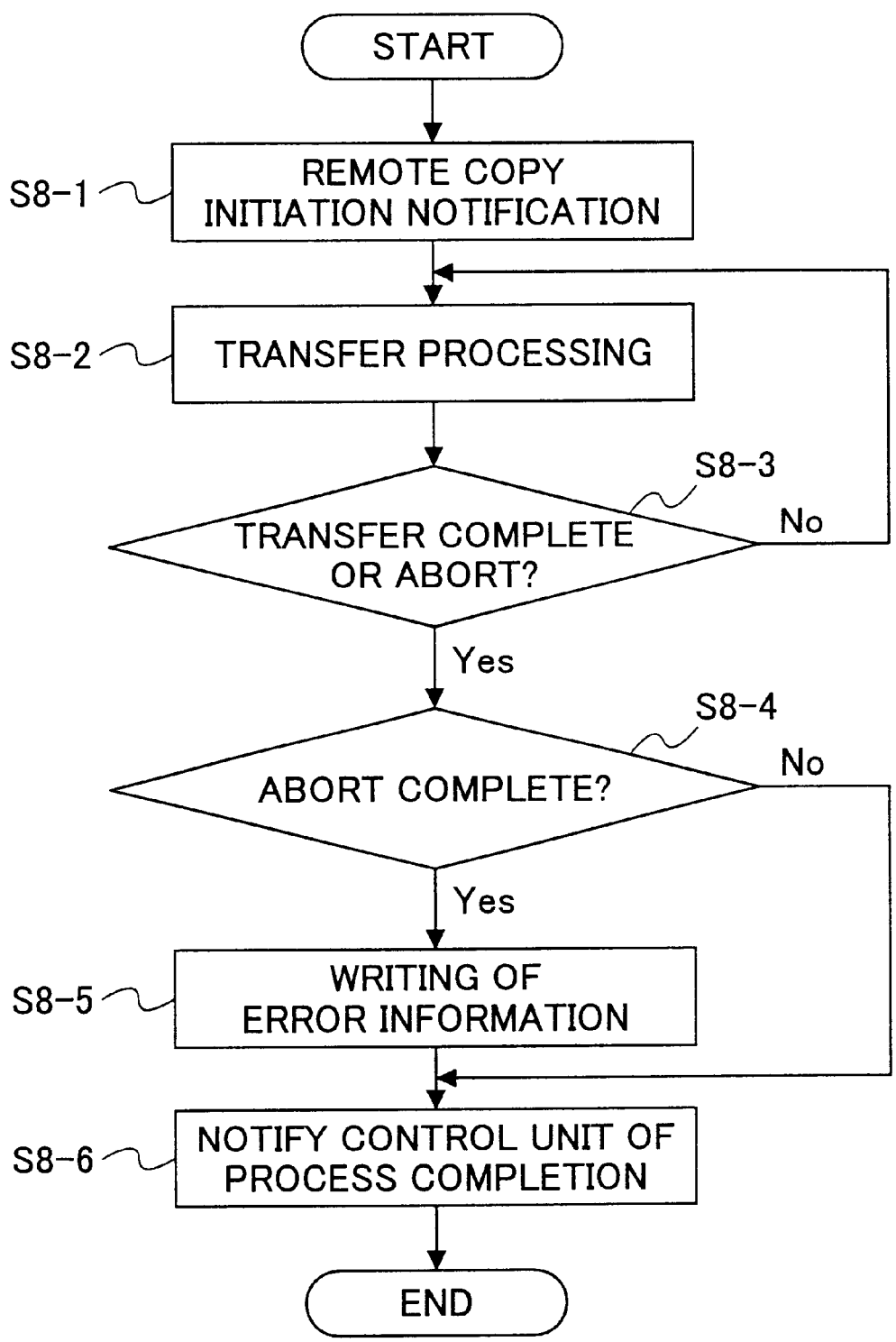
FIG. 12 is a processing flow chart of the remote adapter according to the first embodiment of the present invention.

FIG. 12 is a processing flow chart of the remote adapter 13 according to the first embodiment of the present invention.

The remote adapter 13 process comprises the following steps S8-1 through S8-6.

S8-1 is a step of receiving a remote copy initiation notification from the control unit 14. The control unit 14 gives the remote copy initiation notification to the remote adapter 13 in step S5-4 shown in FIG. 9.

S8-2 is a step of performing the transfer of data on track x, indicated by the transfer control information of domain Ai.

S8-3 is a step of determining whether or not the transfer has been completed, or whether or not an abort has occurred.

If, in step S8-3, the data transfer has been completed, or if an abort has been detected, step S8-4 is performed. S8-4 is a step of determining whether or not an abort has been completed. If an abort has been completed in step S8-4, step S8-5 will be performed. S8-5 is a step of writing error information onto domain Ai corresponding to the transfer control information table 15. S8-6 is a step of notifying the control unit 14 of the completion of the process.

Now, the operation of the device adapter 12 shall be described.

Figure 13:
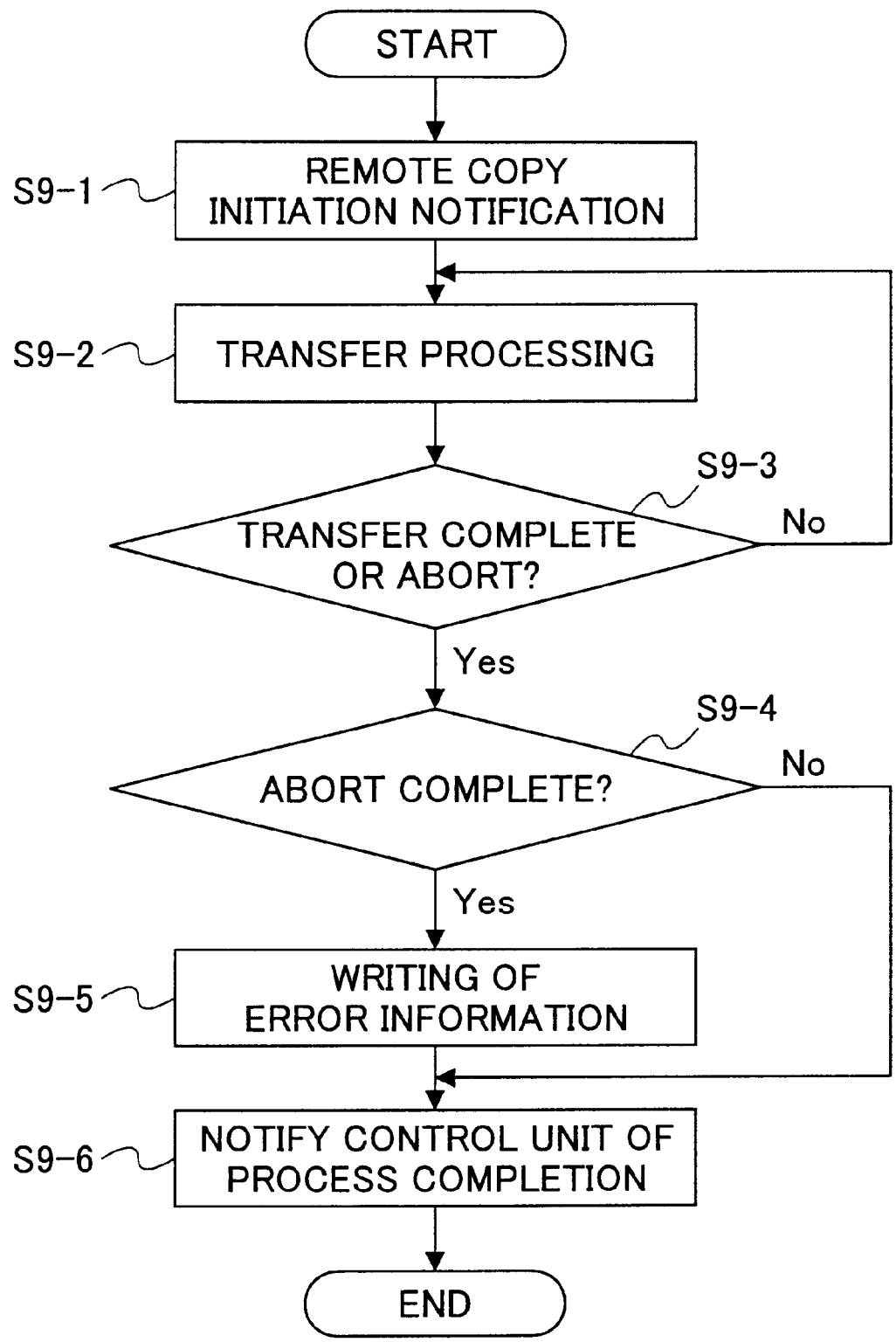
FIG. 13 is a processing flow chart of the device adapter according to the first embodiment of the present invention.

FIG. 13 is a processing flow chart of the device adapter 12 according to the first embodiment of the present invention.

The process of the device adapter 12 comprises the steps S9-1 through S9-6.

S9-1 is a step of receiving the remote copy initiation notification from the control unit 14. The control unit 14 gives the remote copy initiation notification to the device adapter 12 in step S5-4 shown in FIG. 9.

S9-2 is a step of performing the transfer of data on track x indicated by the transfer control information of domain Ai.

S9-3 is a step of determining whether or not the transfer has been completed, or whether or not an abort has occurred.

If, in step S9-3, the data transfer has been completed, or if an abort has been detected, step S9-4 is performed. S9-4 is a step of determining whether or not an abort has been completed. If an abort is completed in step S9-4, step S9-5 will be performed. S9-5 is a step of writing error information onto domain Ax corresponding to the transfer control information table 15. S9-6 is a step of notifying the control unit 14 of the completion of the process.

According to the present embodiment, if the bit Bi of the bit information (a) is a "0", meaning it is spare, it is possible to store new transfer control information in domain Ai corresponding to the transfer control information table 15. Thus, it is not necessary to wait for the complete termination of the transfer control information stored in the transfer control information table 15. Rather, transfer control information can be successively stored into the transfer control information table 15 so that the transfer can be controlled regardless of the capacity of the transfer control information table 15. Consequently, it is possible to perform the transfer without the replacement of the I/O instruction. Also, when the transfer ends in failure, the transfer control information may report the abort information to the host computer 2 without it being re-written. This enables the identification of the causes of the transfer failure.

In the present embodiment, the transfer control information table 15 is provided with a separate transfer control information table bit map 33, and the replacement of the transfer control information is done by re-writing this transfer control information table bit map 33. However, the state of the transfer control information could also be managed by arranging the transfer control information table into a list form.

Figure 14:
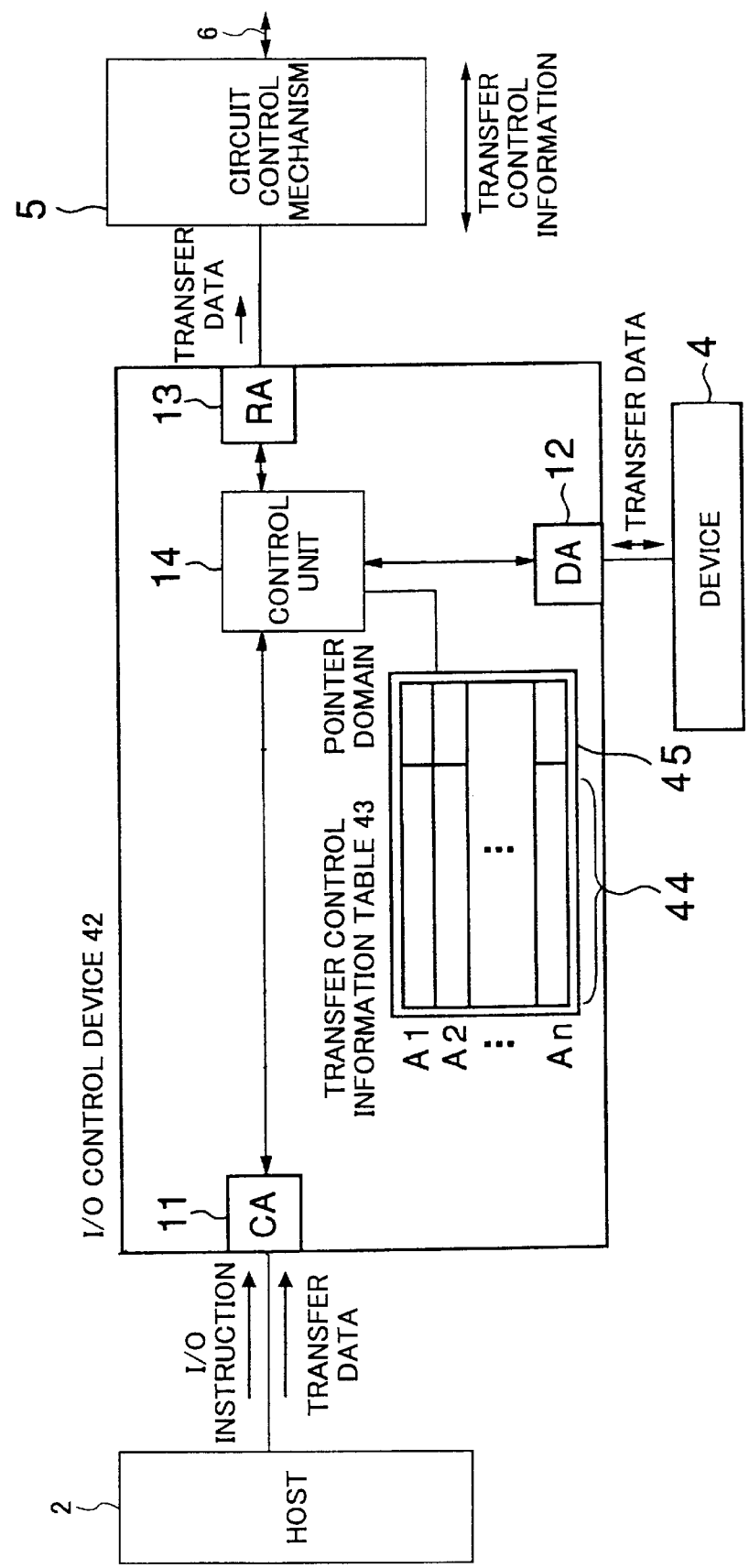
FIG. 14 is a block diagram illustrating a second embodiment of the present invention.

FIG. 14 is a block diagram illustrating the second embodiment of the present invention. The components in the above drawing which correspond to the components in FIG. 1 are given the same numerical notations and their description shall be omitted.

A remote copy system 41 according to the second embodiment has an I/O control device 42 which differs in structure from that according to the first embodiment.

The I/O control device 42 differs from that according to the first embodiment in that the transfer control information table 43 manages the state of each of the transfer control information domains in a list form. The structures of the channel adapter 11, the device adapter 12, the remote adapter 13, and the control unit 14 are the same; however, their processing is different.

First, a detailed description of the transfer control information table 43 shall be given.

FIG. 15 is a data composition diagram of a transfer control information table according to the second embodiment of the present invention. The transfer control information table 43 comprises transfer control information domain 44, pointer domain 45, and start domain 46.

Transfer control information is stored in the transfer control information domain 44. The pointer domain 45 comprises a spare list (a), an in-process list (b), and an abort list (c)

In the spare list (a), the order a1, a2, ... ap in which the transfer control information domains A1 through An are in a spare state is stored as a list. In the in-process list (b), the order b1, b2, ... bq in which the transfer control information domains A1 through An are in a processing state is stored as a list. In the abort list (c), the order c1, c2, ... cr in which the transfer control information domains A1 through An have fallen into an abort state is stored as a list. Here, (p+q+r)=n; and $0 \leq p \leq n$, $0 \leq q \leq n$, $0 \leq r < n$. A "0" means that an end is provided to the start domain and that the domains A1 through An are not included in the list.

In the start domain 46, the number of the domain indicating the start among the transfer control information domains A1 through An is stored.

Now, a detailed description of the operation of the channel adapter 11 shall be given, starting with a description of its operation upon receiving a remote copy I/O instruction from the host computer 2.

Figure 16:
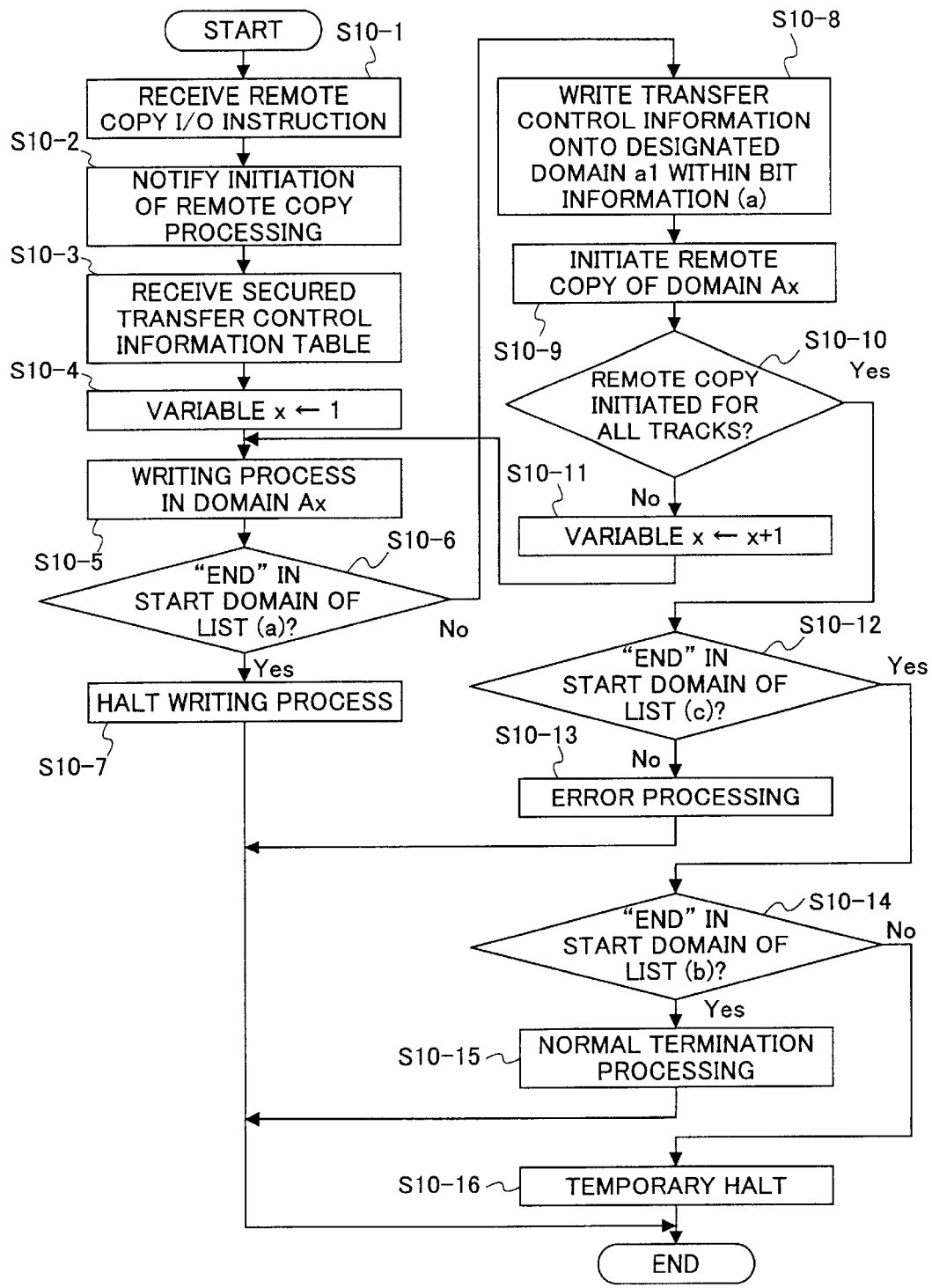
FIG. 16 is a processing flow chart of the channel adapter upon receiving a remote copy I/O instruction, according to the second embodiment of the present invention.

FIG. 16 is a processing flow chart of the channel adapter 11 upon receiving a remote copy I/O instruction.

The process of the channel adapter upon receiving a remote copy I/O instruction comprises steps S10-1 through S10-16.

S10-1 is a step of receiving a remote copy I/O instruction from the host computer 2.

S10-2 is a step of notifying the control unit 14 of the remote copy process initiation.

S10-3 is a step of receiving a notification of having established the transfer control information table 43 from the control unit 14.

S10-4 is a step of replacing variable x with 1.

S10-5 is a step of writing data onto track x which is the $x^{th}$ track of the I/O instruction.

S10-6 is a step of determining whether or not an end is stored as a start number of the start domain 46 of the spare list (a).

If in step S10-6, the end is stored in the start domain 46 of the spare list (a), then step S10-7 will be performed.

S10-7 is a step of halting the operation until information other than the end information is stored in the start domain 46 of the spare list (a)

If in step S10-6, information other than the end information is stored in the start domain 46 of the spare list (a), then step S10-8 will be performed.

S10-8 is a step of writing the transfer control information onto domain Ai (i=a1), which corresponds to the domain a1 indicated as the next domain in the spare list (a).

S10-9 is a step of initiating the remote copying process corresponding to the transfer control information of domain Ai to the control unit 14.

S10-10 is a step of determining whether or not the remote copying has been initiated for all the M number of tracks.

If in step S10-10, the remote copying has not been initiated for all the M number of tracks, then step S10-11 will be performed.

S10-11 is a step of replacing variable x with (x+1). After replacing variable x with (x+1) in step S10-11, the process moves back to step S10-5.

If in step S10-10, the remote copying is initiated for all the M number of tracks, then step S10-12 will be performed. Step S10-12 determines whether or not the start domain 46 of the abort list (c) is an end.

If there is no end assigned to the start domain 46 of the abort list (c), then step S10-13 will be performed. S10-13 is a step of processing an error.

If in step S10-12, an end is set for the start domain 46 of the abort list (c), then step S10-14 will be performed.

S10-14 is a step of determining whether or not an end is set for the start domain 46 of the in-process list (b).

If in step S10-14, an end is set for the start domain 46 of the in-process list (b), then step S10-15 will be performed. S10-15 is a step of performing a normal termination process.

If in step S10-14, an end is not assigned in the start domain 46 of the in-process list (b), then step S10-16 will be performed. S10-16 is a step of halting the writing process.

Now, a description of the operation of the channel adapter 11 upon receiving a process resumption notification from the control unit 14 shall be given.

Figure 17:
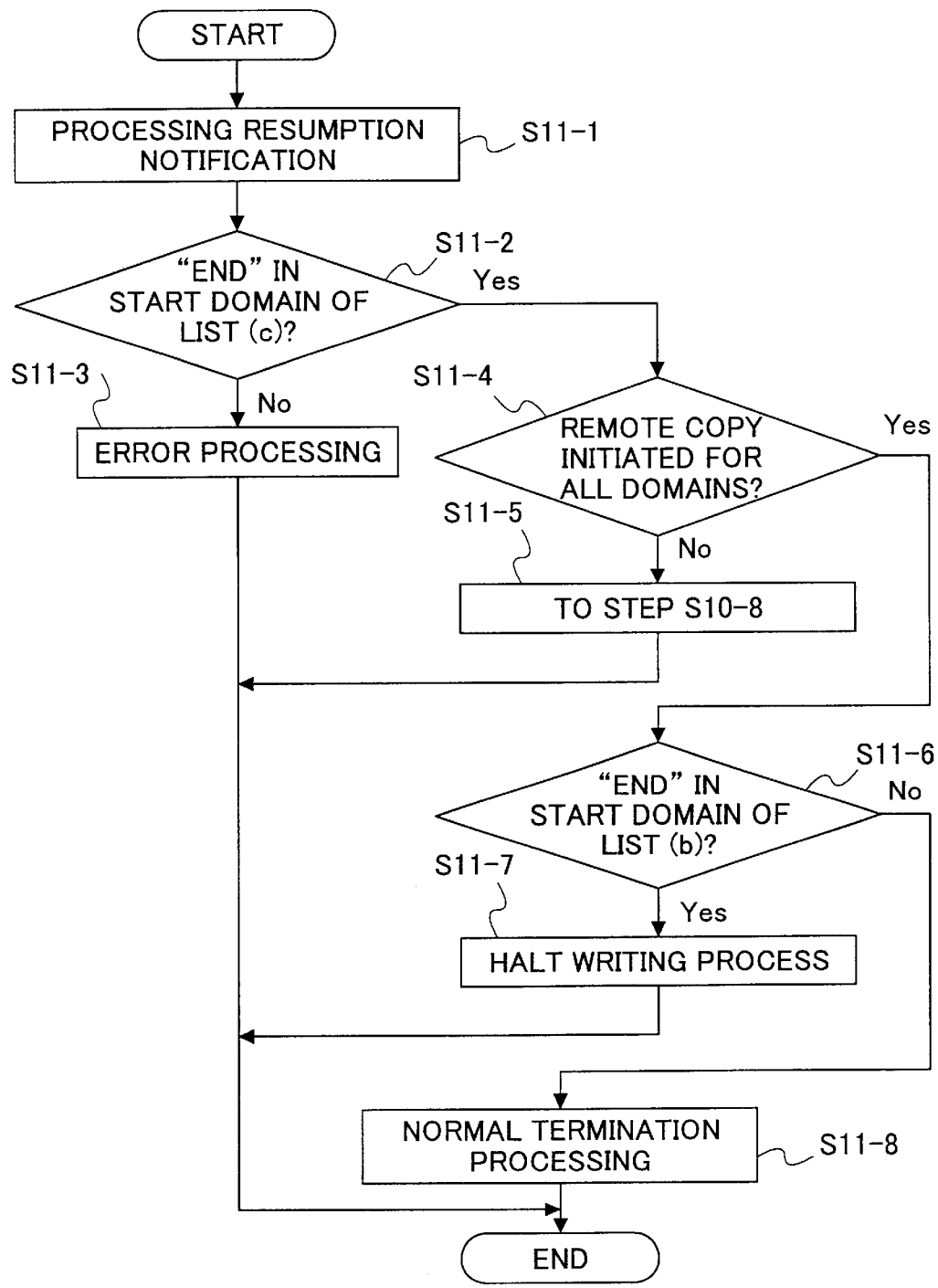
FIG. 17 is a processing flow chart of the channel adapter upon receiving a process resumption notification from the control unit, according to the second embodiment of the present invention.

FIG. 17 is a processing flow chart of the channel adapter 11 upon receiving a process resumption notification from the control unit.

The process of the channel adapter 11 upon receiving a process resumption notification from the control unit 14 comprises steps S11-1 through S11-8.

S11-1 is a step of receiving a process resumption notification from the control unit 14.

S11-2 is a step of determining whether or not an end has been installed for the start domain 46 of the abort list (c).

If in step S11-2, an end is not assigned in the start domain 46 of the abort list (c), then step S11-3 will be performed.

S11-3 is a step of processing an error.

If in step S11-2, an end is assigned in the start domain 46 of the abort list (c), then step S11-4 will be performed.

Step S11-4 is a process of determining whether or not the remote copy has been initiated for all the M number of tracks.

If in step S11-4, the remote copy has not been initiated for all the M number of tracks, then step S11-5 will be performed. S11-5 is a step of moving on to step S10-8 of FIG. 16.

If in step S11-4, the remote copy has been initiated for all the M number of tracks, then step S11-6 will be performed.

S11-6 is a step of determining whether or not an end has been assigned to the start domain 46 of the in-process list (b).

If in step S11-6, an end is not assigned to the start domain 46 of the in-process list (b), then step S11-8 will be performed. Step S11-8 is a step of performing a normal termination process.

Now, a description of the process upon receiving a remote copy I/O instruction shall be given.

Figure 18:
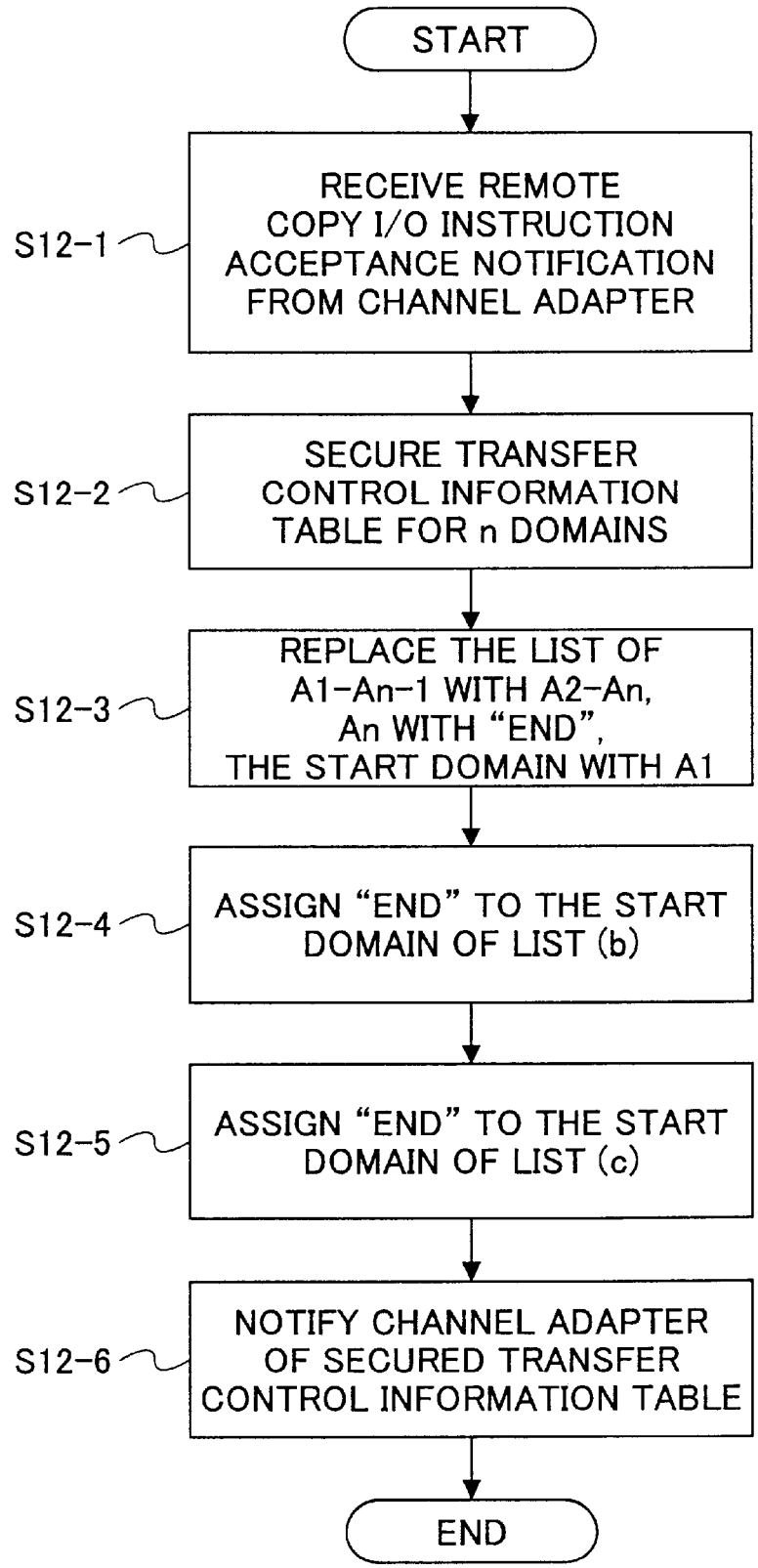
FIG. 18 is a processing flow chart of the control unit upon receiving a remote copy I/O instruction, according to the second embodiment of the present invention.

FIG. 18 is a processing flow chart of the control unit 14 upon receiving a remote copy I/O instruction, according to the second embodiment of the present invention.

The control unit 14 performs the following steps S12-1 through S12-6 upon receiving a remote copy I/O instruction.

S12-1 is a step of receiving a remote copy I/O instruction acceptance notification from the channel adapter 11.

S12-2 is a step of securing the transfer control information table 43 for n number of domains.

S12-3 is an initializing step of assigning A1 to the start domain of list (a), assigning A2 to the domain A1 of list (a), continuing this until reaching the domain An−1 of list (a), and assigning an end to the domain An of the list (a).

S12-4 is a step of assigning an end to the start domain of list (b).

S12-5 is a step of assigning an end to the start domain of list (c)

S12-6 is a step of creating transfer control information table 15 for the channel adapter 11.

The process of receiving a remote copy I/O instruction for the control unit 14 is completed according to the above description.

Now, a description of the operation of the control unit 14 shall be given, starting with its processing in a case of receiving a remote copy initiation notification of track x, which is indicated by the transfer control information of domain Ai, from the channel adapter 11.

Figure 19:
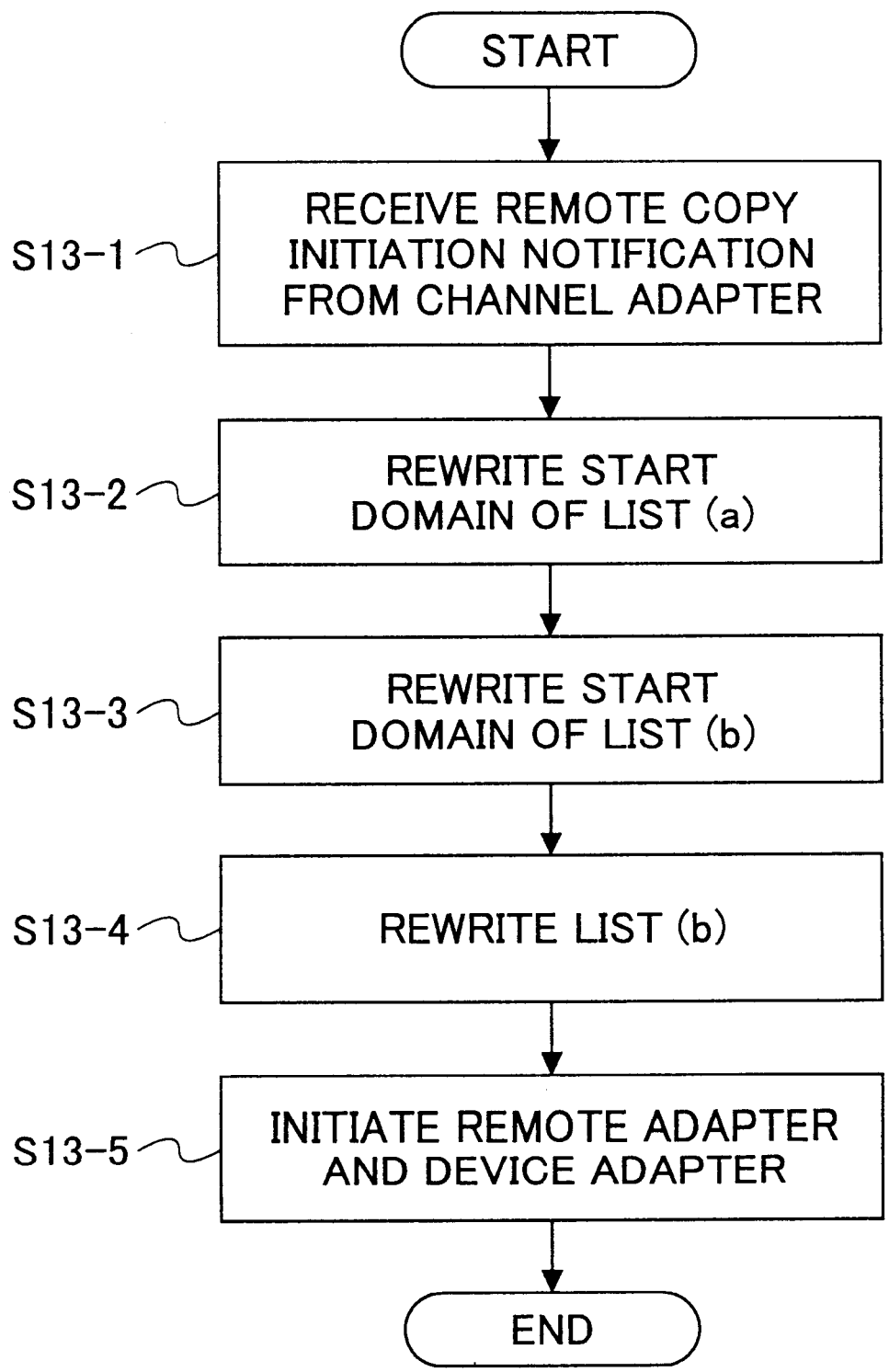
FIG. 19 is a processing flow chart of the control unit upon being notified of a remote copy initiation by the channel adapter, according to the second embodiment of the present invention.

FIG. 19 is a processing flow chart of the control unit 14 upon receiving notification of the remote copy initiation from the channel adapter 11.

The process of the control unit 14 upon receiving a remote copy initiation notification from the channel adapter 11 comprises the steps S13-1 through S13-5.

S 13-1 is a step of receiving the remote copy initiation notification from the channel adapter 11.

S13-2 is a step of re-writing the start domain 46 of the spare list (a) to the next to next number, namely the third number in order from the start.

For example, if the start is a0, then the start domain is re-written to a2.

S13-3 is a step of re-writing the start domain 46 of the in-process list (b). Step S13-3 is a process of re-writing the start domain 46 of the in-process list (b), to the number deleted from the start domain 46 of the spare list (a).

S13-4 is a step of re-writing to the number originally represented by the start domain 46 of the in-process list (b). It is a process of re-writing the number deleted from the spare list (a) to the number originally represented by the start domain 46.

S13-5 is a step of initiating the remote adapter 13 and the device adapter 12.

Now, a description of the operation of the control unit 14 upon receiving a process completion notification from the remote adapter 13 and the device adapter 12 shall be given.

Figure 20:
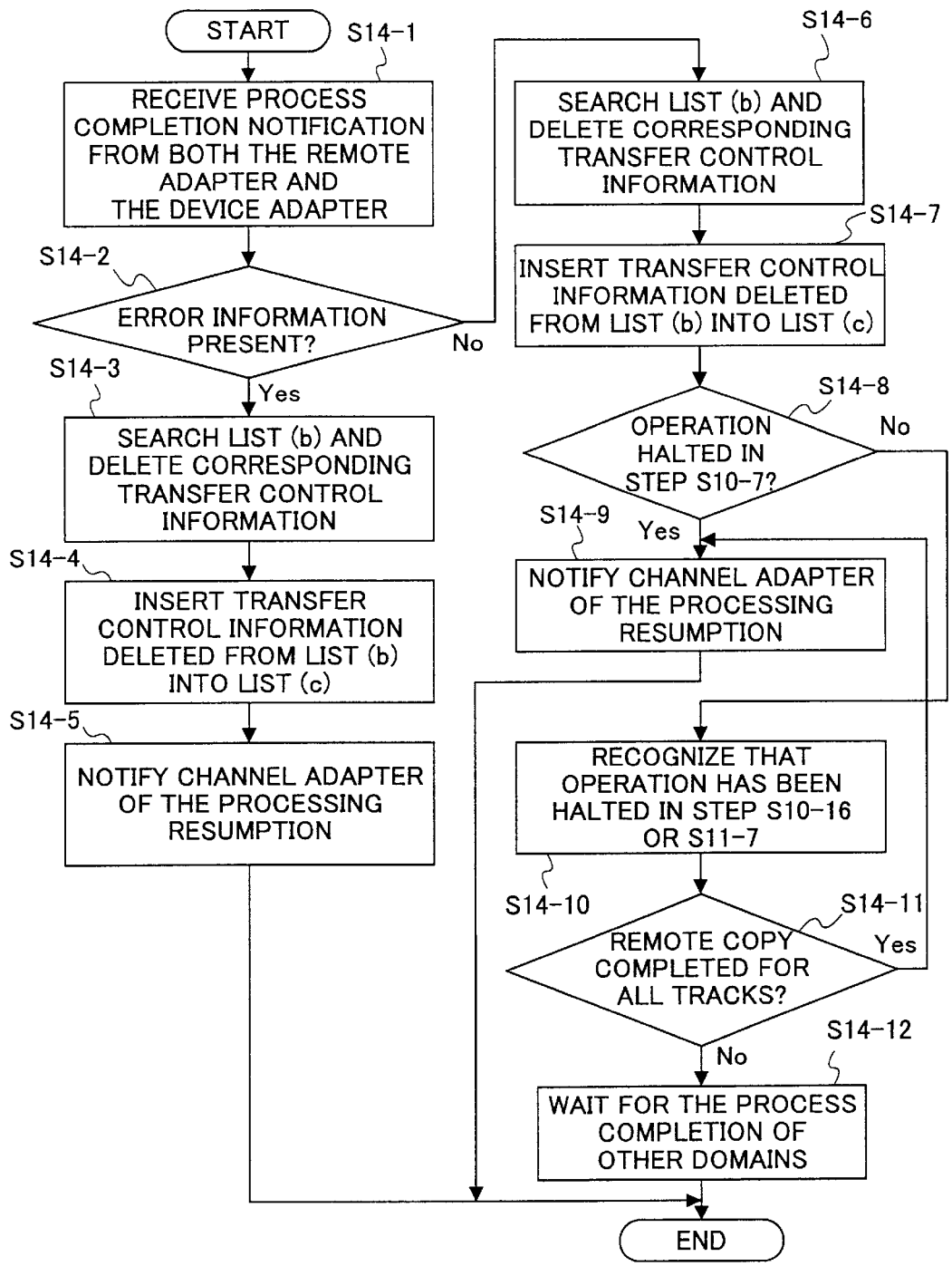
FIG. 20 is a processing flow chart of the control unit upon receiving a process completion notification from the remote adapter and the device adapter, according to the second embodiment of the present invention.

FIG. 20 is a processing flow chart of the control unit 14 upon receiving a process completion notification from the remote adapter 13 and the device adapter 12, according to the second embodiment of the present invention.

The process of the control unit 14 upon receiving a process completion notification from the remote adapter 13 and the device adapter 12 comprises the steps S14-1 through S14-12.

S14-1 is a step of receiving the process completion notification from the remote adapter 13 and the device adapter 12.

S14-2 is a step of determining whether or not there is any error information.

If error information is found in step S14-2, then the steps S14-3 through S14-5 will be performed.

S14-3 is a step of re-writing the in-process list (b). In step S14-3, the in-process list is searched from the number of the start domain 46, and the corresponding number is deleted from the list.

S14-4 is a step of re-writing the abort list (c). In step S14-4, the number deleted from the in-process list (b) in step S14-3 is inserted into the abort list (c).

S14-5 is a step of notifying the channel adapter 11 of the resumption of the process.

If there is no error information found in step S14-2, then the steps S14-6 through S14-12 will be performed.

S14-6 is a step of re-writing the in-process list (b). Step S14-6 performs the same process as step S13-3.

S14-7 is a step of re-writing the spare list (a) In step S14-7, the number deleted from the in-process list (b) in step S13-6 is inserted into the spare list (a).

In step S14-8, it is determined whether or not the operation has come to a halt state in step S10-7. If it is determined in step S14-8 that the operation in step S10-7 has come to a halt, then step S14-9 will be performed.

S14-9 is a step of notifying the channel adapter 11 of the resumption of the process.

If it is determined in step S14-8 that the operation has come to a halt other than in step S10-7, then step S14-10 will be performed. S14-10 is a step of recognizing that the operation has come to a halt in steps S10-16 or S11-7.

S14-11 is a step of determining whether or not the remote copy for all the M number of tracks has been completed. If it is determined in step S14-11 that the remote copy for all the M number of tracks has been completed, then a notification of the process resumption is conveyed to the channel adapter 11 in step S14-9.

If it is determined in step S14-11 that the remote copy has not been completed for all the M number of tracks, then step S14-12 will be performed.

S14-12 is a step of waiting for the completion of the process of the other domains.

Since the operations of the remote adapter 13 and the device adapter 12 are the same as those of the first embodiment, their description shall be omitted.

As shown above, the state of the transfer control information can also be managed in a list form.

What is claimed is:

1. An I/O control device that transfers data according to any one of a plurality of sets of transfer control information, comprising:

a transfer control information memory having a plurality of domains respectively storing each of said transfer control information;

a state detecting unit having a plurality of domains, each of which corresponding to a respective one of said domains of said transfer control information memory, said state detecting unit detecting the processed state of each of the transfer control information stored in each of said domains of said transfer control information memory; and a transfer control information memory control unit controlling the storing of new transfer control information in the transfer control information memory in place of said transfer control information upon completion of transfer control information-dependent transfer processing as a result of the detection by said state detecting unit.

2. The I/O control device as claimed in claim 1:

wherein said state detecting unit detects an error state; and, said transfer control information memory control unit provides said transfer control information to said transfer control information memory upon detection of said error state by said state detecting unit.

3. The I/O control device as in claim 1:

wherein said state detecting unit manages the processed state of the transfer control information in a bit map state.

4. The I/O control device as in claim 1:

wherein said state detecting unit manages the processed state of the transfer control information in a list form.

5. The I/O control device as in claim 2:

wherein said state detecting unit manages the processed state of the transfer control information in a bit map state.

6. The I/O control device as in claim 2:

wherein said state detecting unit manages the processed state of the transfer control information in a list form.

* * * * *